Figure 1:
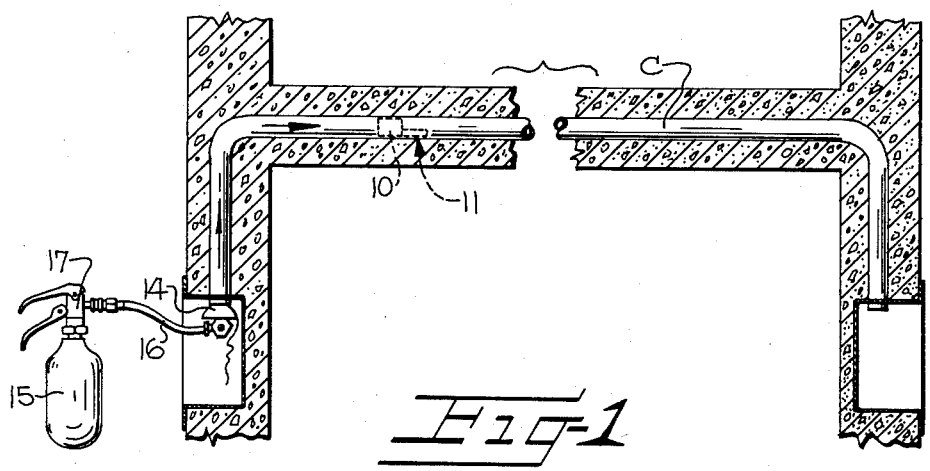

Feb. 11, 1964  J. C. HAMRICK  3,120,947
METHOD AND APPARATUS FOR INTRODUCING LINES THROUGH CONDUITS
Filed March 12, 1962

INVENTOR:
JAMES C. HAMRICK
BY Eaton, Bell, Hunt + Seltzer
ATTORNEYS

United States Patent Office 3,120,947
Patented Feb. 11, 1964

3,120,947
METHOD AND APPARATUS FOR INTRODUCING
LINES THROUGH CONDUITS
James C. Hamrick, Charlotte, N.C., assignor to Jet Line
Products, Inc., Charlotte, N.C., a corporation of North
Carolina
Filed Mar. 12, 1962, Ser. No. 178,801
9 Claims. (Cl. 254—134.4)

This invention relates to a method and apparatus for introducing a guide line through a conduit to facilitate the installation of a relatively rigid line or similar elongated article—such as an electrical cable or conductor, a lengthy thermo-sensitive element, etc.—within the length of the conduit by attaching the relative rigid line to one end of the guide line extending through the conduit and thereafter pulling on the other end of the guide line to draw the relatively rigid line within the conduit.

In my earlier U.S. Patent 3,006,607, issued October 31, 1961, there were disclosed a method and apparatus for the purpose described, wherein the apparatus included a flexible elongated roll of line having a cross-sectional area of a size substantially filling the internal diameter of the conduit through which a pliable guide line is to be introduced, fluid pressure being directed against the roll of line from one end of the conduit to propel the roll through the conduit, while paying out line therefrom in the length of conduit as the roll travels through the conduit. Situations may arise in which the outer diameter of an elongated roll of line is relatively small as compared to the internal diameter of the conduit through which the guide line is to be introduced. Under such circumstances, the use of fluid pressure directed against a comparatively small-sized line package as contrasted to the internal diameter of the conduit may be uneconomical because of the high percentage of wasted fluid pressure passing beyond the small-sized line package in the space between the line package and the internal wall of the conduit which does not contribute to the forward movement of the line package in the conduit. In extreme instances, the disparity in diameters as between the elongated line package and the conduit through which it is to be passed may be so great as to cause the line package to depart from its head-long flight through the conduit and to assume a position where its longitudinal axis is transversely disposed with respect to the longitudinal axis of the conduit, or the line package may even reverse itself within the conduit. Such occurrences would seriously impair the efficiency of the line package in paying out line within the length of the conduit or may even stop this function altogether.

My copending U.S. patent application, Serial No. 178,802, filed March 12, 1962, discloses a method and apparatus for laying a guide line in the length of a conduit which are particularly applicable in situations of the type described above, wherein the outer diameter of an elongated roll of line is relatively small as compared to the internal diameter of the conduit through which a guide line is to be introduced. In my aforesaid U.S. patent application, various embodiments utilizing an elongate line carrier of highly compressible, flexible, resilient material having a substantially uniform transverse cross-section of a size exceeding the transverse cross-section of the passage in the conduit to afford a substantial area of sealing engagement between the line carrier and the internal wall surface of the conduit are described, fluid pressure being directed against the rear end of each of such line carriers to thrust the line carrier through the conduit for laying the line carried thereby in the length of the conduit while preventing leakage of fluid pressure past the line carrier.

The present invention accomplishes in a different manner the same purpose of the various embodiments described in my aforesaid copending U.S. patent application—that purpose being the introduction of a guide line through the length of a conduit by utilizing fluid pressure as a motivating force in an economical manner by preventing the leakage of fluid pressure past the media employed in introducing the guide line through the conduit. To this end, it is a primary object of the present invention to provide a method and apparatus for introducing a guide line through a conduit, wherein the apparatus includes an elongated plug of highly compressible, flexible, resilient material adapted to sealingly engage the internal wall of the conduit over a substantial area and a roll of line positioned ahead of the plug within the conduit—the plug acting as a pressure ram or piston under the influence of fluid pressure directed against its rear end to push the roll of line ahead of it through the conduit with line being payed out in the length of the conduit in response to the forward movement of the roll of line. The present method and apparatus are particularly applicable in instances when the outer diameter of the roll of line is relatively small as compared to the internal diameter of the conduit through which the guide line is to be introduced.

Further and more specific objects and advantages of the invention will become apparent as the description proceeds, when taken in connection with the accompanying drawings, in which—

Figure 2:
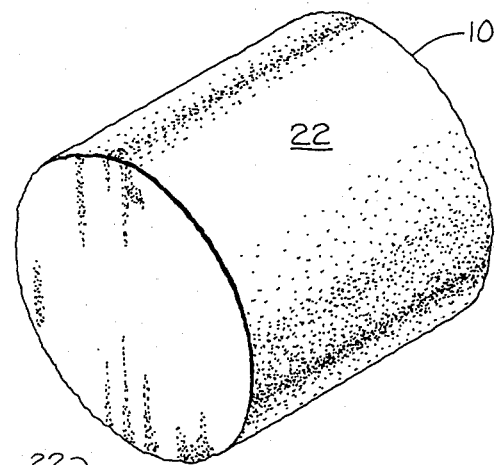
Figure 3:
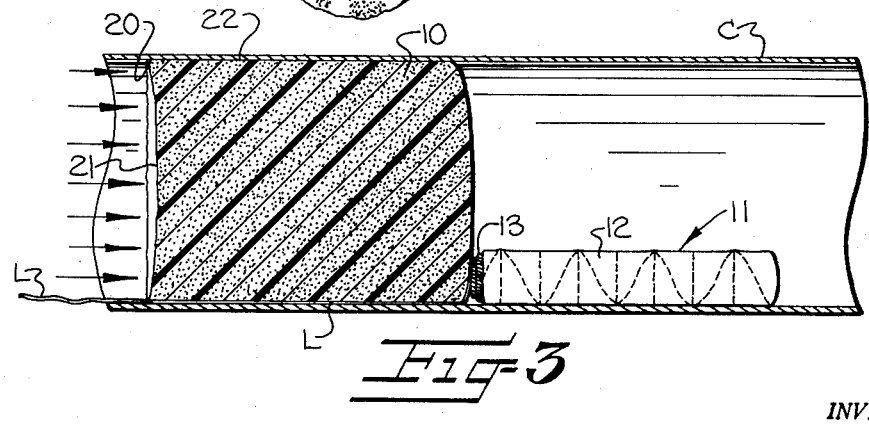

FIGURE 1 is a schematic view showing a conduit extending through a building, wherein a line package is being pushed through the conduit by a pressure-responsive ram or piston to introduce a guide line through the conduit in accordance with the present invention;

FIGURE 2 is an isometric view of an elongated cylindrical plug serving as a pressure-responsive ram or piston in accordance with the present invention; and FIGURE 3 is a fragmentary longitudinal sectional view showing the pressure-responsive ram or piston of FIGURE 2 as it pushes a line package through the conduit under the influence of fluid pressure, the line package being illustrated in elevation.

Referring more specifically to the drawings, FIGURE 1 schematically illustrates the present method and apparatus for introducing a guide line through a conduit C which extends throughout a building and includes angular bends at various locations along its length, the conduit C being suitable for receiving electrical conductors or similar relatively rigid elongated articles therein.

In practicing the method in accordance with the present invention, the apparatus so employed includes an elongated cylindrical plug 10, hereinafter referred to as a pressure-responsive ram or piston, which is adapted to be forced through the conduit C by the application of fluid pressure against the trailing end thereof. The cylindrical ram 10 is flexible and resilient throughout its length and possesses a high degree of compressibility, being preferably made of elastomeric synthetic foam material, such as polyurethane foam. It will be observed in FIGURE 3 that the cylindrical ram 10 is accompanied in its movement through the conduit C by an elongated substantially cylindrical line package 11 which is positioned in front of the cylindrical ram 10 within the conduit C.

The line package 11 comprises a casing or wrapping 12 of suitable pliable material, such as paper or plastic, the casing 12 having an elongated substantially cylindrical shape, and a supply of pliable line L snugly received within the casing 12. The supply of line L is wound in an elongated substantially cylindrical roll 13, being preferably wound so that the line L will be unwound from its center outwardly in paying out the line L in the length of the conduit C, as will be presently described. It is contemplated that the casing 12 may be applied about the elongated roll 13 of line L as a thin coating to adhere the outer windings of the line L together for maintaining the cylindrical shape of the roll 13 of line L. It should be understood, however, that the line package 11 could consist of the cylindrical roll 13 of line alone.

A length of the line L is withdrawn from the trailing end of the cylindrical roll 13, the trailing length of line L extending longitudinally across the peripheral surface of the cylindrical ram 10 and rearwardly thereof so as to terminate at a point proximate the end of the conduit C into which the line package 11 and the cylindrical ram 10 are to be initially inserted. In this respect, it will be observed in FIGURE 1 that the trailing length of line L from the line package 11 extends outwardly of the end of the conduit C, being fixedly secured along a portion thereof to the conduit C by a tapered sealing adaptor 14 partially wedged within the end of the conduit C. The tapered sealing adaptor 14 is placed against the open end of the conduit C to provide a closure therefor preventing the escape of fluid pressure from this end of the conduit C, the sealing adaptor 14 including a centrally disposed bore (not shown) through which fluid pressure from a suitable source, such as a portable container 15 of compressed gas, is directed into the conduit C by means of flexible tubing 16. A manually operable valve 17 is disposed in the dispensing outlet of the portable container 15 to control the flow of fluid pressure into one end of the conduit C through the flexible tubing 16 and the sealing adaptor 14.

In utilizing the apparatus to introduce a guide line through a conduit, the line package 11 is first inserted into an open end of the conduit C with a length of the line L extending from the cylindrical roll 13 and trailing behind the line package 11 in the manner previously described. The cylindrical ram 10 is then inserted into the open end of the conduit C behind the line package 11, it being understood that the cylindrical ram 10 has a diameter exceeding that of the conduit C so as to cause the cylindrical ram 10 to be compressed upon its insertion into the conduit C. The resulting compression of the elastomeric synthetic foam material of the ram 10 produces a peripheral, annular, rearwardly flaring tail 20 on the trailing end of the ram 10, and a concave depression 21 is formed in the trailing end of the ram 10, as illustrated in FIGURE 3. The outer peripheral surface of the ram 10 defines an elongated cylindriform sealing area 22 in sealing engagement with the internal wall surface of the conduit C. The nature of the highly compressible, elastomeric synthetic foam material of the ram 10 is such that the substantial area of sealing engagement afforded by the cylindriform sealing area 22 of the ram 10 with the internal wall surface of the conduit C does not materially increase the frictional resistance encountered by the ram 10 as it is thrust through the conduit C by fluid pressure, while providing a fluid-tight seal of enhanced effectiveness to prevent the leakage of fluid pressure forwardly of the ram 10 between the ram 10 and the internal wall surface of the conduit C. Whatever frictional resistance may be present can be further reduced by forming the outer peripheral surface defining the cylindriform sealing area 22 of the highly compressible, elastomeric synthetic foam material of the ram 10 as a smooth, thin, impervious skin. Upon opening the valve 17 on the container 15 of compressed gas, fluid pressure is directed against the rear end of the ram 10 to thrust the ram 10 forwardly in the conduit C, the ram 10 in turn pushing the line package 11 ahead of it as it proceeds through the conduit C. In this connection, the fluid pressure is guided within the concave depression 21 formed in the rear end of the ram 10 and is also directed against the peripheral, annular, rearwardly flaring tail 20 on the ram 10 in a manner tending to urge the tail 20 in a radially outward direction to further increase the effectiveness of the fluid-tight seal between the ram 10 and the internal wall surface of the conduit C. The tail 20 on the ram 10, thus, acts as a pressure-responsive sealing lip under the influence of the fluid pressure issuing from the container 15 into the conduit C.

It will be observed that the portion of the trailing length of line L from the line package 11 which contacts the cylindrical ram 10 and the internal wall surface of the conduit C is clamped therebetween. As the ram 10 is thrust forwardly by the fluid pressure directed thereagainst to push the line package 11 through the conduit C, line L is payed out from the elongated roll of line 13 in the length of the conduit C with the ram 10 moving through the conduit C in engagement with the internal wall surface of the conduit C and the portion of the trailing length of line L immediately behind the line package 11 which is clamped between the ram 10 and the internal wall surface of the conduit C. The flexibility exhibited by the ram 10 and the line package 11 which precedes it in the conduit C throughout the longitudinal extents of these elements enables both the ram 10 and the line package 11 to successfully negotiate sharp angular bends which may be formed in the conduit C, the ram 10 and the line package 11 flexing to conform with an angular bend in the conduit C as they pass therealong. In this way, the cylindrical ram 10 is thrust through the conduit C by the force of fluid pressure dispensed from a portable container 15 and directed thereagainst to push the line package 11 through the conduit, the guide line L being thereby payed out from the cylindrical elongated roll 13 of the line package 11 in the length of the conduit C as the line package 11 is pushed forwardly without needlessly wasting fluid pressure.

While the pressure-responsive ram or piston 10 has been described herein as being substantially cylindrical in shape for employment within cylindrical conduits, it should be understood that pressure-responsive rams or piston having various cross-sectional shapes, such as rectangular, triangular, etc. may be employed for the purpose described with conduits having passages with transverse cross-sections complementary thereto. The roll 13 of line L may also be wound in a shape other than an elongated cylinder—such as a substantially ball-like shape, for example—where circumstances permit.

It will therefore be seen that I have disclosed a method and apparatus for introducing a guide line through a conduit which complement the method and apparatus described in my copending U.S. patent application Serial No. 178,802, filed March 12, 1962, being especially suitable when the disparity between the smaller diameter of a line package and the larger internal diameter of a conduit through which a guide line is to be introduced is so great as to render the use of fluid pressure in accordance with the method and apparatus disclosed in my prior U.S. Patent 3,006,607 uneconomical.

In the drawings and specification there has been set forth a preferred embodiment of the invention and, although specific terms are employed, they are used in a generic and descriptive sense only and not for purposes of limitation, the scope of the invention being defined in the claims.

I claim:

1. A method of introducing a line through a conduit comprising the steps of
   (a) inserting a roll of line having a length of line trailing therebehind in one end of a conduit,
   (b) inserting a separate plug independent of the roll of line in said one end of the conduit behind the roll of line with the trailing length of line extending between the plug and the internal wall surface of the conduit,
   (c) moving the plug forwardly through the conduit to push the roll of line thereahead, and
   (d) paying out line from the roll of line in response to forward movement of the roll of line as it is pushed through the conduit by the plug therebehind.

2. A method of introducing a line through a conduit comprising the steps of
  (a) inserting a roll of line having a length of line trailing therebehind in one end of a conduit,
  (b) inserting a sepaarte plug independent of the roll of line in said one end of the conduit behind the roll of line with the trailing length of line extending between the plug and the internal wall surface of the conduit,
  (c) directing fluid pressure against the plug,
  (d) pushing the roll of line through the conduit by forcing the plug forwardly under the influence of fluid pressure, and
  (e) paying out line from the roll of line in response to forward movement of the roll of line as it is pushed through the conduit by the plug therebehind.

3. A method of introducing a line through a conduit comprising the steps of
  (a) inserting a roll of line having a length of line trailing therebehind in one end of a conduit,
  (b) inserting a separate plug of compressible material having a substantially uniform transverse cross-section of a size exceeding the transverse cross-section of the conduit passage in said one end of the conduit behind the roll of line, while
  (c) establishing a fluid-tight area of sealing engagement between the internal wall surface of the conduit and the plug with the trailing length of line clamped between the plug and the internal wall surface of the conduit,
  (d) directing fluid pressure against the plug,
  (e) pushing the roll of line through the conduit by forcing the plug forwardly along the trailing length of line under the influence of fluid pressure while continuing the fluid-tight area of sealing engagement between the plug and the internal wall surface of the conduit, and
  (f) paying out line from the roll of line in response to forward movement of the roll of line as it is pushed through the conduit by the plug therebehind.

4. An apparatus for introducing a line through a conduit comprising
  (a) a roll of line having a length of line trailing therebehind,
  (b) an elongated plug of compressible material having a substantially uniform transverse cross-section of a size exceeding the transverse cross-section of the passage in the conduit through which the line is to be introduced,
  (c) said plug being disposed behind said roll of line and having a peripheral surface defining an elongated sealing area for sealing engagement with the internal wall surface of the conduit,
  (d) the length of line trailing behind said roll of line extending longitudinally across the elongated sealing area of said plug and rearwardly of said plug,
  (e) means for propelling said plug through the conduit,
  (f) said plug being urged into abutment with said roll of line disposed forwardly thereof by said propelling means and pushing said roll of line forwardly as said plug moves along the length of line trailing behind said roll of line under the influence of said propelling means, and
  (g) said line being unwound from said roll of line and payed out in the conduit in response to forward movement of said roll of line as it is pushed through the conduit by said plug therebehind.

5. An apparatus for introducing a line through a conduit comprising
  (a) a roll of line having a length of line trailing therebehind,
  (b) an elongated plug of compressible material having a substantially uniform transverse cross-section of a size exceeding the transverse cross-section of the passage in the conduit through which the line is to be introduced,
  (c) said plug being disposed behind said roll of line and having a peripheral surface defining an elongated sealing area for sealing engagement with the internal wall surface of the conduit,
  (d) the length of line trailing behind said roll of line extending longitudinally across the elongated sealing area of said plug and rearwardly of said plug,
  (e) a source of fluid pressure,
  (f) means for directing fluid pressure from said source against the rear end of said plug to propel said plug through the conduit,
  (g) said plug being urged into abutment with said roll of line disposed forwardly thereof and pushing said roll of line forwardly as said plug moves along the length of line trailing behind said roll of line under the influence of fluid pressure directed thereagainst, and
  (h) said line being unwound from said roll of line and payed out in the conduit in response to forward movement of said roll of line as it is pushed through the conduit by said plug therebehind.

6. An apparatus for introducing a line through a conduit comprising
  (a) an elongated roll of line having a length of line trailing therebehind,
  (b) an elongated cylindrical plug of compressible material having a substantially uniform transverse circular cross-section with a diameter exceeding the internal diameter of the conduit through which the line is to be introduced,
  (c) said plug being disposed behind said roll of line and having an outer peripheral surface defining an elongated cylindriform sealing area for sealing engagement with the internal wall surface of the conduit,
  (d) the length of line trailing behind said roll of line extending longitudinally across the elongated cylindriform sealing area of said plug and rearwardly of said plug,
  (e) a source of fluid pressure,
  (f) means for directing fluid pressure from said source against the rear end of said plug to propel said plug through the conduit,
  (g) said plug being urged into abutment with said roll of line disposed forwardly thereof and pushing said roll of line forwardly as said plug moves along the length of line trailing behind said roll of line under the influence of fluid pressure directed thereagainst, and
  (h) said line being unwound from said roll of line and payed out in the conduit in response to forward movement of said roll of line as it is pushed through the conduit by said plug therebehind.

7. An apparatus for introducing a line through a conduit comprising
  (a) a roll of line having a length of line trailing therebehind,
  (b) an elongated plug of compressible material having a substantially uniform transverse cross-section of a size exceeding the transverse cross-section of the passage in the conduit through which the line is to be introduced,
  (c) said plug being disposed behind said roll of line and having a peripheral surface defining an elongated sealing area for sealing engagement with the internal wall surface of the conduit,
  (d) the length of line trailing behind said roll of line extending longitudinally across the elongated sealing area of said plug and rearwardly of said plug,
  (e) means for developing a pressure differential forming regions at opposite ends of said plug of sufficient difference in pressure to cause the plug to be moved through the conduit, (f) said plug being urged into abutment with said roll of line disposed forwardly thereof by actuation of said pressure differential developing means and pushing said roll of line forwardly as said plug moves along the length of line trailing behind said roll of line in response to actuation of said pressure differential developing means, and (g) said line being unwound from said roll of line and payed out in the conduit in response to forward movement of said roll of line as it is pushed through the conduit by said plug therebehind.

8. An apparatus for introducing a line through a conduit comprising (a) a roll of line having a length of line trailing therebehind, (b) a flexible, resilient elongated plug of highly compressible foam material having a substantially uniform transverse cross-section of a size exceeding the transverse cross-section of the passage in the conduit through which the line is to be introduced, (c) said plug being disposed behind said roll of line and having an outer impervious skin forming its peripheral surface to provide an elongated sealing area with a low coefficient of friction for sealing engagement with the internal wall surface of the conduit, (d) the length of line trailing behind said roll of line extending longitudinally across the elongated sealing area of said plug and rearwardly of said plug, (e) means for developing a pressure differential forming regions at opposite ends of said plug of sufficient difference in pressure to cause the plug to be moved through the conduit, (f) said plug being urged into abutment with said roll of line disposed forwardly thereof by actuation of said pressure differential developing means and pushing said roll of line forwardly as said plug moves along the length of line trailing behind said roll of line in response to actuation of said pressure differential developing means, and (g) said line being unwound from said roll of line and payed out in the conduit in response to forward movement of said roll of line as it is pushed through the conduit by said plug therebehind.

9. A method of introducing a line through a conduit comprising the steps of (a) inserting a roll of line having a length of line trailing therebehind in one end of a conduit, (b) inserting a separate plug of compressible material having a substantially uniform transverse cross-section of a size exceeding the transverse cross-section of the conduit passage in said one end of the conduit behind the roll of line, while (c) establishing a fluid-tight area of sealing engagement between the internal wall surface of the conduit and the plug with the trailing length of line clamped between the plug and the internal wall surface of the conduit, (d) developing a pressure differential forming regions at opposite ends of the plug of sufficient difference in pressure to cause the plug to be moved forwardly through the conduit, (e) pushing the roll of line through the conduit by moving the plug forwardly in the conduit along the trailing length of line while continuing the fluid-tight area of sealing engagement between the plug and the internal wall surface of the conduit, and (f) paying out line from the roll of line in response to forward movement of the roll of line as it is pushed through the conduit by the plug therebehind.

References Cited in the file of this patent

UNITED STATES PATENTS

| | | |
|---|---|---|
| 252,956 | Loane | Jan. 31, 1882 |
| 297,929 | Goebel | Apr. 29, 1884 |
| 2,906,650 | Wheaton | Sept. 29, 1959 |
| 3,006,607 | Hamrick | Oct. 31, 1961 |